No. 720,256. PATENTED FEB. 10, 1903.
H. F. A. KLEINSCHMIDT.
CLAMP.
APPLICATION FILED APR. 22, 1902.
NO MODEL.
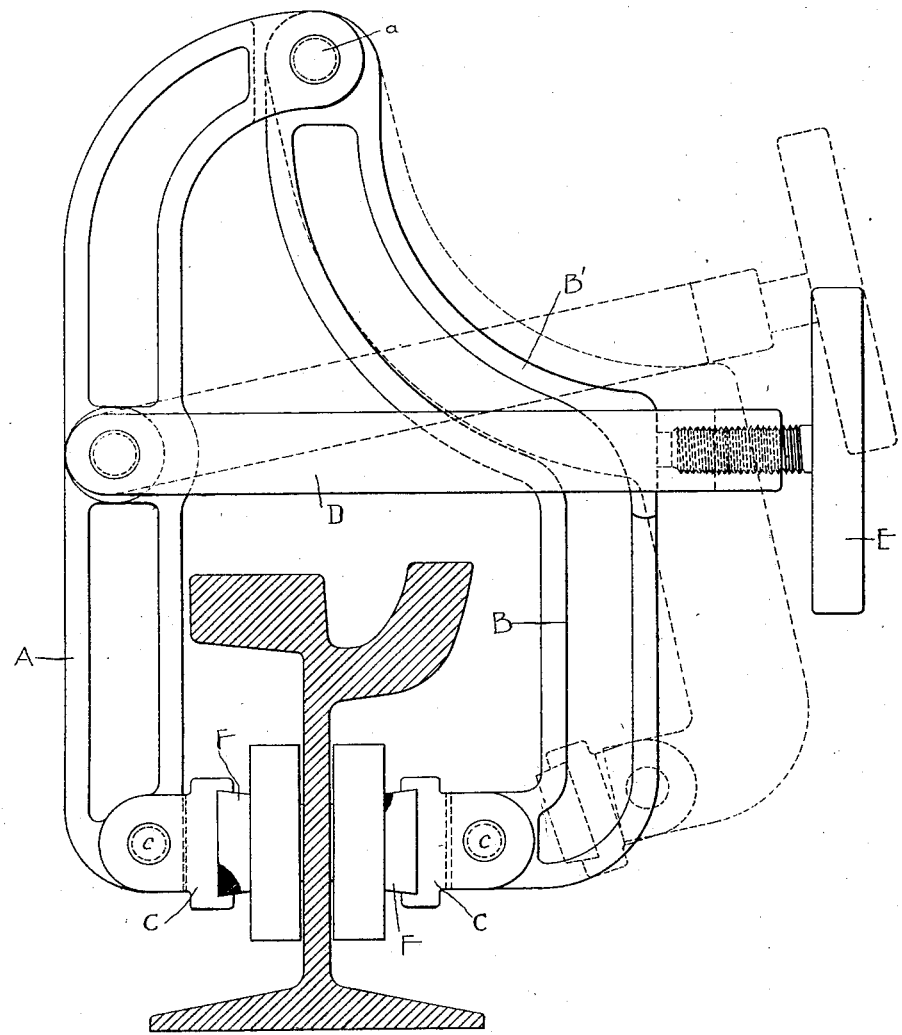

UNITED STATES PATENT OFFICE.

HENRY F. A. KLEINSCHMIDT, OF JOHNSTOWN, PENNSYLVANIA, ASSIGNOR TO THE LORAIN STEEL COMPANY, A CORPORATION OF PENNSYLVANIA.

CLAMP.

SPECIFICATION forming part of Letters Patent No. 720,256, dated February 10, 1903.

Application filed April 22, 1902. Serial No. 104,128. (No model.)

*To all whom it may concern:*

Be it known that I, HENRY F. A. KLEINSCHMIDT, of Johnstown, in the county of Cambria and State of Pennsylvania, have invented a new and useful Improvement in Clamps, of which the following is a full, clear, and exact description, reference being had to the accompanying drawing, which forms a part of this specification.

My invention has relation to certain new and useful improvements in clamps, and more particularly to clamps which are adapted for use in the operation of welding rail-joints for the purpose of holding the joint or splice bars in position on the rails preparatory to welding. For this purpose it is desirable to have a clamp which can be quickly applied and removed, and since the joint or splice bars must be grasped over the heads of the rails the ordinary clamps in which the jaws are manipulated by set-screws require too much time for that operation, because of the fact that the jaws must have a considerable opening or spread to pass the head of the rail.

The object of this invention is to provide a clamp in which a very slight movement of the clamp-screw is sufficient to set or release the jaws, and thus enable the clamp to be quickly applied and removed from the work, also to provide for the adjustment of the clamps or grips, whereby they will always take a square grasp of the work.

With these objects in view my invention consists in the novel construction and combination of parts, all as hereinafter described, and pointed out in the appended claims, reference being had to the accompanying drawing, which is an elevation of a clamp embodying my invention, shown in full lines as in use and in dotted lines in its released position.

In the drawing the letters A and B designate, respectively, the two jaws or members of the clamp, united at their upper ends by a pivot $a$ and carrying each at its lower end an inwardly-extending jaw or grip C. The lower portion of each member is substantially straight, so as to assume in operation a position nearly parallel to the corresponding portion of the other member. The upper portion of the member A is curved inwardly to the pivot $a$, while the upper portion of the member B has a reëntrant curve, as shown at B'. B is a slotted yoke or link, which is pivoted to the intermediate portion of the member A and embraces the member B, its outer end having a seat for a set-screw E. When the clamp is set, as shown in full lines in Fig. 1, the screw E takes a bearing against the outer face of the member B, and thus holds the jaws or grips tightly to the work. To release the clamp, a slight backward turn of the screw permits the link or yoke to be thrown upwardly over the inwardly-curved portion B' of the member B, and thereby permits the clamp to be opened to a distance amply sufficient to pass the head of the rail.

Inasmuch as the joint-bars vary somewhat in thickness, I preferably make the jaws or grips C of separate pieces and secure them to the members A and B by pivots $c$. This permits the jaws to adjust themselves to always take a square grip on the work. I also prefer to provide the working face of each jaw with a block F of wood fiber or other tough insulating material. Otherwise sufficient of the welding-current will pass around through the jaws to heat them to a considerable extent.

I do not wish to limit myself to the exact construction and arrangement of parts herein shown and described, as changes may be made in the details thereof without departing from the spirit and scope of my invention.

Having thus described my invention, what I claim as new, and desire to secure by Letters Patent, is—

1. The herein-described clamp, comprising two pivoted jaw members, one of which has its upper portion curved inwardly, a link or yoke pivoted to the other of said members and embracing the member having the inwardly-curved portion, and a set-screw carried by said link or yoke.

2. The herein-described clamp comprising the pivoted jaw members A and B, the latter having the reëntrant curved portion B', the link or yoke D, and a set-screw carried by said link or yoke.

3. The herein-described clamp comprising the two pivoted jaw members, the slotted yoke or link pivoted to one of the said members and embracing the other member, the set-screw carried by said yoke or link, and the jaws or grips pivoted to said members.

4. In a clamp, the combination with two interpivoted jaw members, one of which has an inward, or reëntrant, curved portion between its pivot and its jaw, of a clamp or link pivoted to the other jaw member and arranged to swing over the said curved portion.

In testimony whereof I have affixed my signature in presence of two witnesses.

HENRY F. A. KLEINSCHMIDT.

Witnesses:
L. O'CONNELL,
H. W. SMITH.